US012659428B1

(12) United States Patent (10) Patent No.: US 12,659,428 B1
Ryskamp et al. (45) Date of Patent: Jun. 16, 2026

(54) CHANGING DIRECTIONS OF GAZE DURING A VIDEO CONFERENCE

(71) Applicant: Zoom Communications, Inc., San Jose, CA (US)

(72) Inventors: Robert Allen Ryskamp, Mountain View, CA (US); David Patrick Vronay, Danville, CA (US)

(73) Assignee: Zoom Communications, Inc., San Jose, CA (US)

( * ) Notice: Subject to any disclaimer, the term of this patent is extended or adjusted under 35 U.S.C. 154(b) by 225 days.

(21) Appl. No.: 18/349,640

(22) Filed: Jul. 10, 2023

(51) Int. Cl.
| *H04N 7/15* | (2006.01) |
| *G06F 3/01* | (2006.01) |
| *G06T 17/00* | (2006.01) |
| *H04N 7/14* | (2006.01) |

(52) U.S. Cl.
CPC ............. *H04N 7/152* (2013.01); *G06F 3/013* (2013.01); *G06T 17/00* (2013.01); *H04N 7/147* (2013.01)

(58) Field of Classification Search
CPC ........ H04N 7/152; H04N 7/147; G06F 3/013; G06T 17/00
USPC ...................................................... 348/14.09
See application file for complete search history.

(56) References Cited

U.S. PATENT DOCUMENTS

| | | | |
|---|---|---|---|
| 8,154,583 B2 | 4/2012 | Kurtz et al. | |
| 9,582,075 B2 | 2/2017 | Luebke | |
| 9,749,581 B2 | 8/2017 | Nilsson et al. | |
| 9,913,578 B2 | 3/2018 | Taguchi et al. | |
| 10,554,921 B1 * | 2/2020 | Lim ........................ | G06V 40/18 |
| 11,144,754 B2 | 10/2021 | Hu et al. | |
| 11,580,395 B2 | 2/2023 | Karras et al. | |
| 12,347,235 B2 * | 7/2025 | Dal Zotto .............. | G06V 40/18 |
| 2010/0016049 A1 * | 1/2010 | Shirakawa .............. | A63F 13/10 |
| | | | 463/9 |
| 2018/0098027 A1 | 4/2018 | Lubelsky et al. | |
| 2022/0141422 A1 | 5/2022 | Bathiche et al. | |
| 2022/0182524 A1 | 6/2022 | Rewatkar et al. | |
| 2022/0210368 A1 | 6/2022 | Barrett et al. | |
| 2022/0286314 A1 * | 9/2022 | Meyer ................. | H04L 12/1827 |
| 2022/0326902 A1 * | 10/2022 | Raucher ............. | H04M 7/0027 |
| 2023/0049533 A1 | 2/2023 | He et al. | |
| 2023/0051409 A1 * | 2/2023 | Du ......................... | H04N 7/157 |
| 2023/0064462 A1 * | 3/2023 | Santhar ................. | H04M 3/562 |
| 2023/0319233 A1 * | 10/2023 | Sommerlade ........ | G06V 40/103 |
| | | | 348/14.16 |
| 2024/0211200 A1 * | 6/2024 | Silfvast ................... | G06F 3/165 |

* cited by examiner

*Primary Examiner* — Binh Kien Tieu
(74) *Attorney, Agent, or Firm* — Young Basile Hanlon & MacFarlane, P.C.

(57) ABSTRACT

A system may identify, during a video conference, a first participant based on a direction of a gaze of a second participant toward a user tile associated with the first participant within a graphical user interface of the video conference. The system may cause a change, in a video stream transmitted to a device of the first participant during the video conference, to the direction of the gaze of the second participant to appear directed toward a camera of a device of the second participant. In some implementations, the system may cause a change, in a second video stream transmitted to a device of a third participant, to the direction of the gaze of the second participant to appear directed toward the user tile.

20 Claims, 9 Drawing Sheets

800

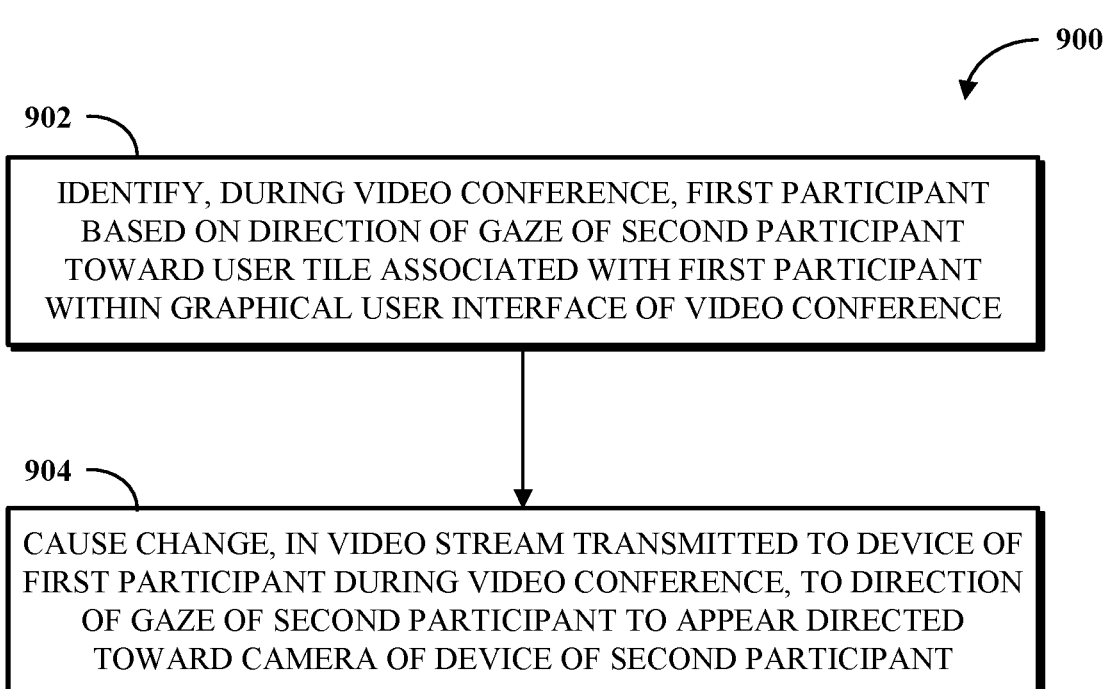

900

902

IDENTIFY, DURING VIDEO CONFERENCE, FIRST PARTICIPANT BASED ON DIRECTION OF GAZE OF SECOND PARTICIPANT TOWARD USER TILE ASSOCIATED WITH FIRST PARTICIPANT WITHIN GRAPHICAL USER INTERFACE OF VIDEO CONFERENCE

904

CAUSE CHANGE, IN VIDEO STREAM TRANSMITTED TO DEVICE OF FIRST PARTICIPANT DURING VIDEO CONFERENCE, TO DIRECTION OF GAZE OF SECOND PARTICIPANT TO APPEAR DIRECTED TOWARD CAMERA OF DEVICE OF SECOND PARTICIPANT

FIG. 9

CHANGING DIRECTIONS OF GAZE DURING A VIDEO CONFERENCE

FIELD

This disclosure relates generally to video conferencing and, more specifically, to changing directions of gaze during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a flowchart of an example of a technique for changing directions of gaze during a video conference.

DETAILED DESCRIPTION OF THE DRAWINGS

Figure 1:
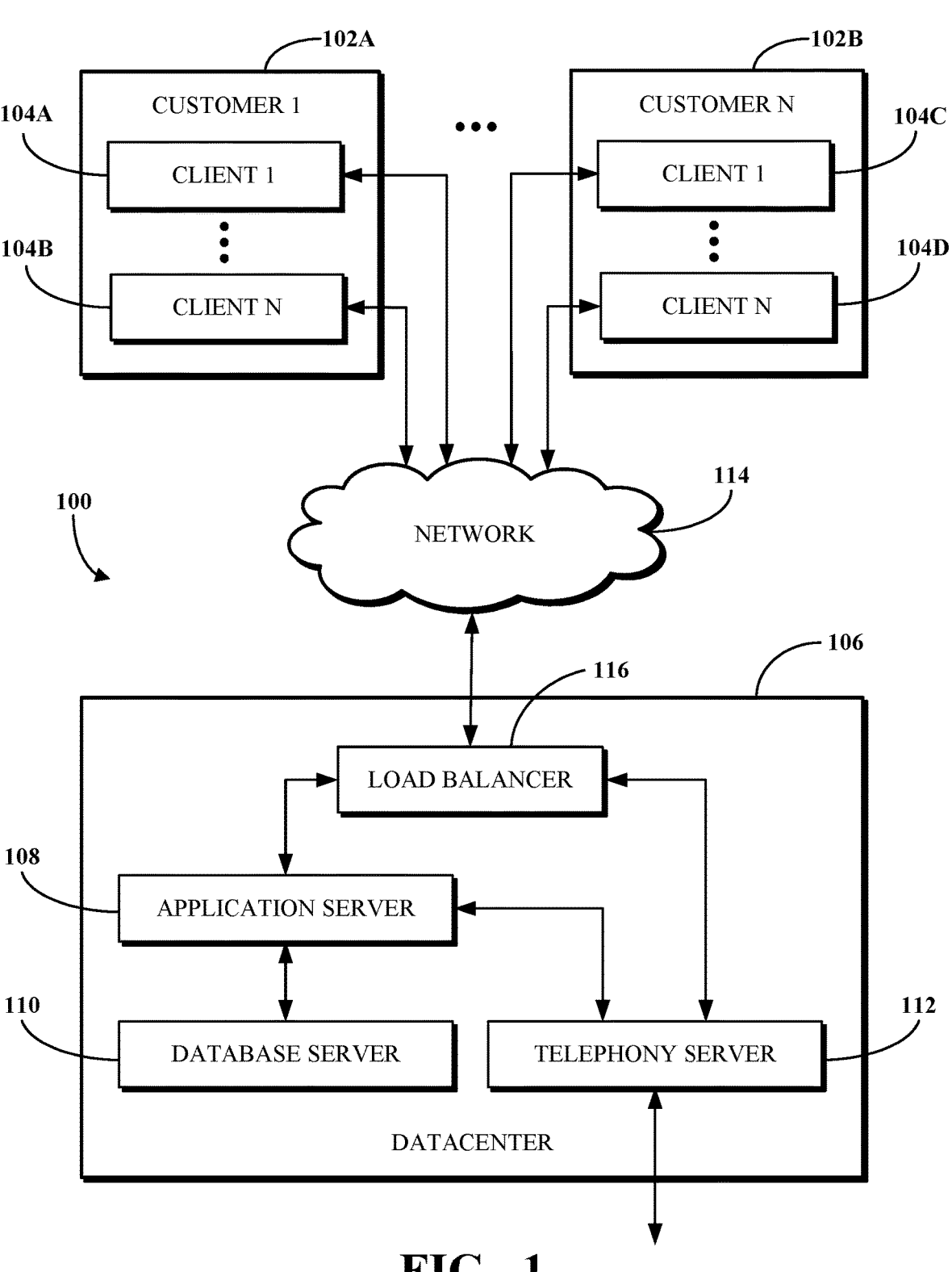
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Individuals may use software such as of a unified communications as a service (UCaaS) platform to communicate and collaborate remotely with one another as participants of a video conference. For example, during a video conference, participants may use cameras and microphones to transmit video and audio streams to other participants, and may use displays and speakers to receive video and audio streams from the other participants. However, participants may not always look into their cameras when speaking to other participants. For example, in some cases, a participant may instead look at the user tile of another participant on their display. As a result, when a first participant is speaking directly to a second participant, and the first participant is looking at their display instead of their camera, the second participant may see the first participant looking in a random direction (e.g., other than toward the camera). This results in a loss of eye contact between the first participant and the second participant. Further, when the first participant does look directly into their camera, all other participants will see the first participant looking directly at them, regardless of the first participant speaking directly to the second participant. This may cause confusion as to which participant in particular the first participant may be addressing.

Implementations of this disclosure address problems such as these by utilizing software to follow a gaze of a participant during a video conference, and to digitally correct the gaze of the participant to simulate direct eye contact with another participant during the video conference. The software can detect a subject participant a particular participant may be looking at, and, in separate video feeds transmitted to each of the other participants in the video conference, digitally correct the gaze of that particular participant to appear to be looking at the subject participant that the particular participant is addressing. In some implementations, a system can identify, during a video conference, a first participant based on a direction of a gaze of a second participant toward a user tile associated with the first participant within a GUI of the video conference. For example, a plurality of user tiles, including the user tile associated with the first participant, could be output to the GUI in a gallery layout. The system can identify the user tile based on a direction of a gaze of the second participant toward the user tile in the gallery layout. In some cases, this may include calculating, from pupils of the second participant, an intersection point at the GUI, and correlating the intersection point to the user tile. In some cases, this may include using a trained machine learning model to determine an intersection point at the GUI based on the gaze, and correlating the intersection point to the position of the user tile. The system can cause a change, in a video stream transmitted to a device of the first participant during the video conference, to the direction of the gaze of the second participant to appear directed toward a camera of a device of the second participant (e.g., correcting the gaze at a first endpoint, relative to the first participant). The system can also cause a change, in a second video stream transmitted to a device of the second participant, to the direction of the gaze of the second participant in a second user tile to appear directed toward the user tile of the first participant (e.g., correcting the gaze at a second endpoint, relative to the second participant). The system can also cause a change, in a third video stream transmitted to a device of a third participant, to the direction of the gaze of the second participant in a second user tile to appear directed toward a user tile of the first participant (e.g., correcting the gaze at a third endpoint, relative to the third participant). As a result, when the second participant is speaking directly to the first participant, and the second participant is looking at the GUI in their display instead of their camera, the first participant will perceive the second participant as looking directly at them. Further, the third participant will perceive the second participant as looking directly at the first participant.

In some implementations, a system may use gaze detection and digital pupil correction to simulate direct eye contact in a multi-person video conference. The software can detect which participant a particular participant is looking at, and in the participant's video feed of the particular participant, the particular participant's pupils may be adjusted digitally to appear looking straight at the camera. Other participants not looking at the particular participant may appear to be looking elsewhere in their video feeds. In some implementations, gaze detection software, and in some cases hardware (e.g., multiple cameras), can detect where on a screen a first participant (P1) is looking. P1's conferencing software can match a nearest participant video to that location on the screen, such as a video associated with a second participant (P2). The P2's conferencing software can then adjust the iris and/or pupil location in the video of P1 to appear focused straight ahead, looking at the P2. When P1 looks away from the P2, the iris and/or pupil locations are no longer corrected (or may be adjusted to be looking at the next participant that P1 focuses on).

To describe some implementations in greater detail, reference is first made to examples of hardware and software structures used to implement a system for changing directions of gaze during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
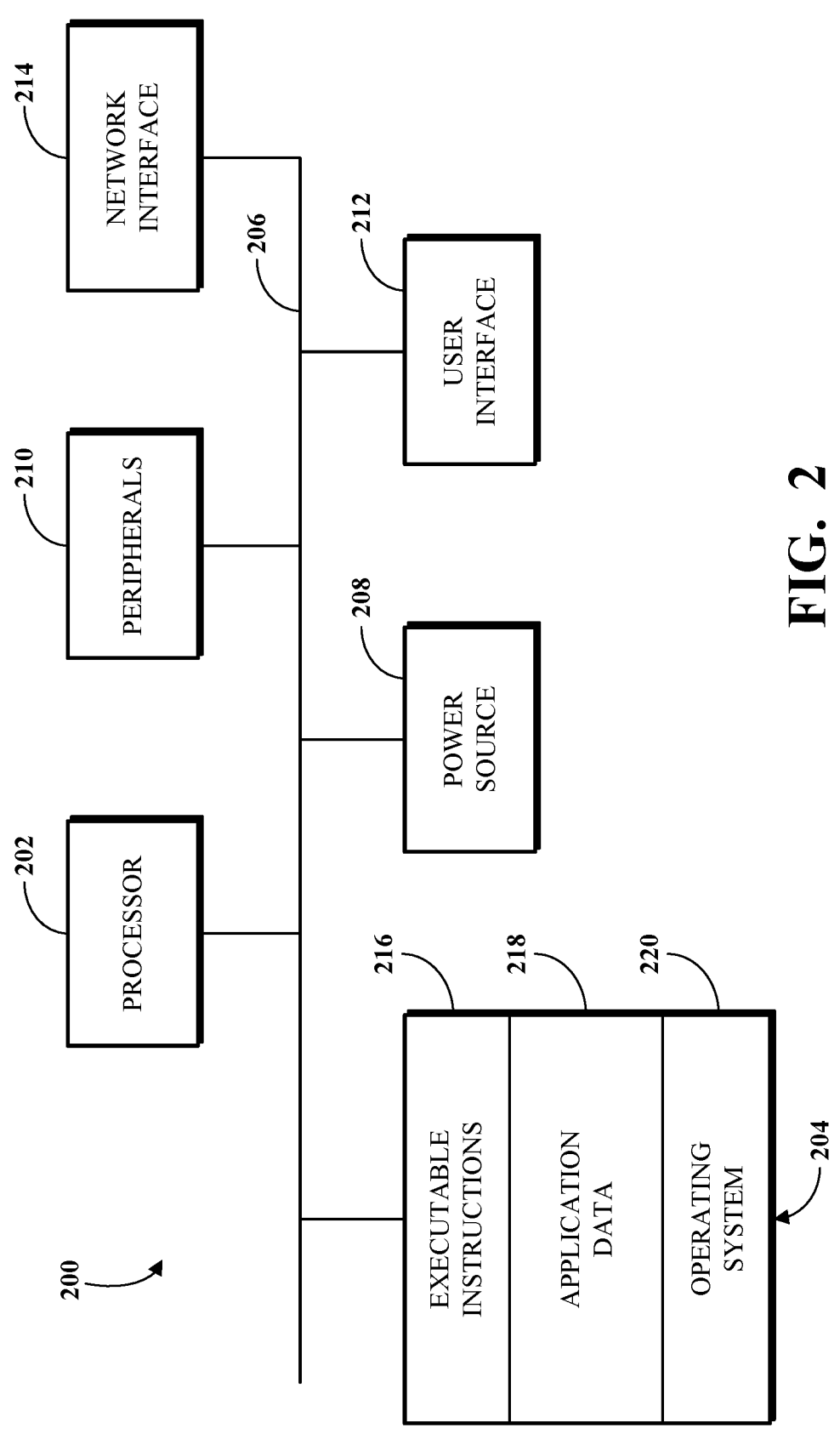
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be RAM (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
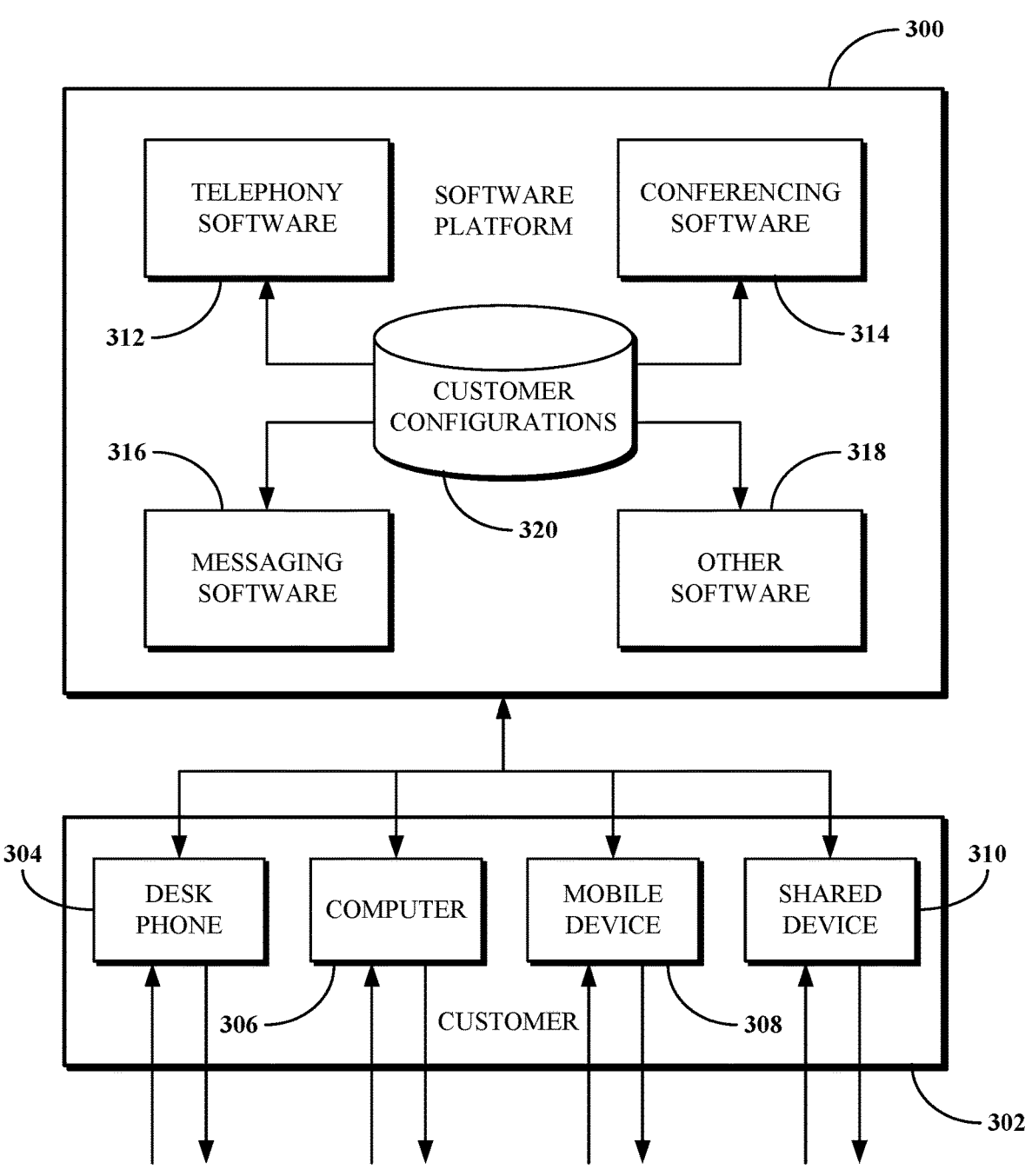
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for changing directions of gaze during a video conference. In some such cases, the conferencing software 314 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
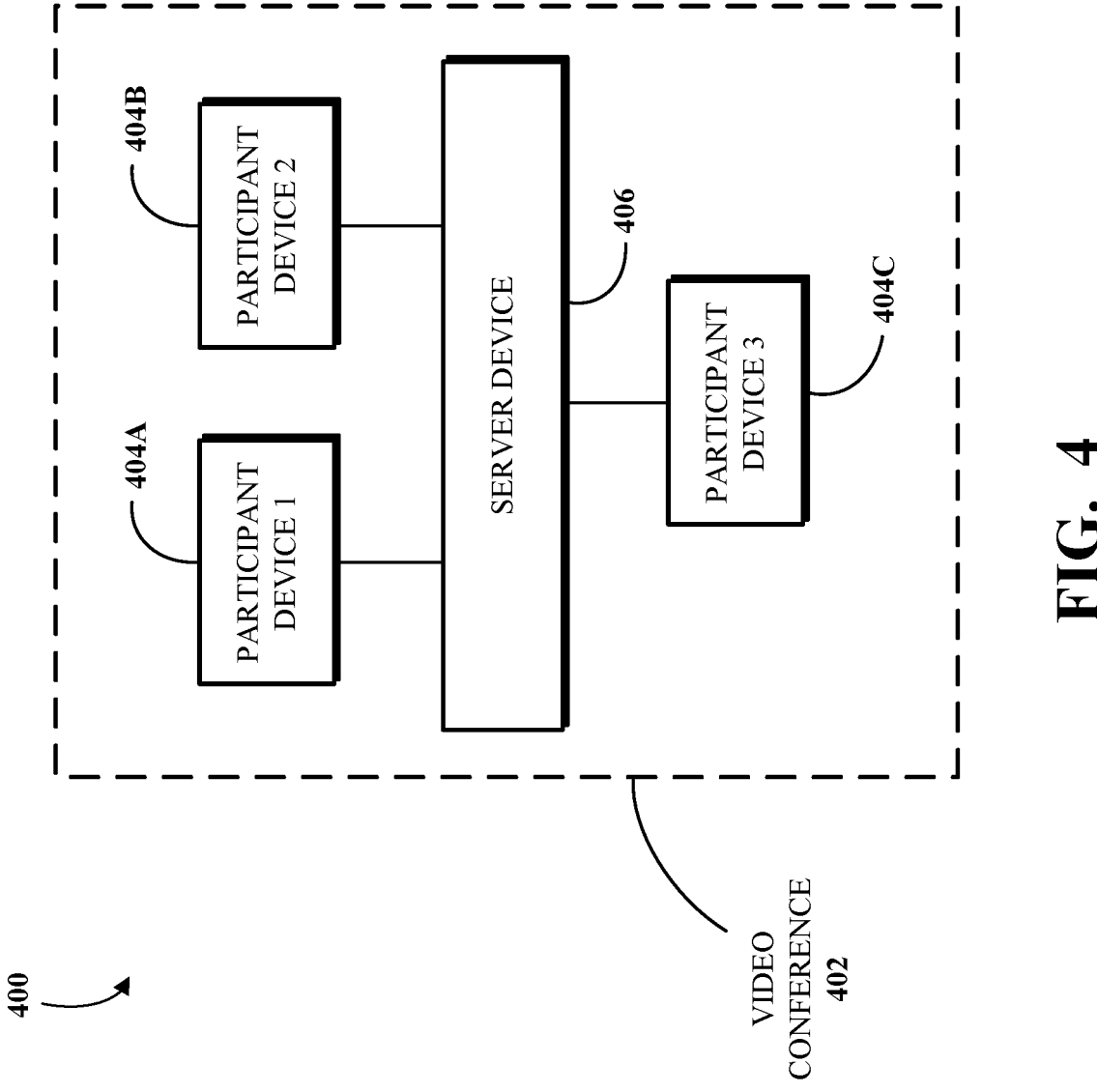
FIG. 4 is a block diagram of an example of a system that changes directions of gaze during a video conference.

FIG. 4 is a block diagram of an example of a system 400 that changes directions of gaze during a video conference 402. The video conference 402 may include multiple conference participants connected to the video conference 402 using participant devices, such as a first participant ("participant 1," or "P1") using a participant device 404A, a second participant ("participant 2," or "P2") using a participant device 404B, and a third participant ("participant 3," or "P3") using a participant device 404C. Each of the participant devices 404A to 404D may be a client device such as one of the clients 104A through 104D shown in FIG. 1 or 304 through 310 shown in FIG. 3. A participant device such as the participant devices 404A to 404C may execute software (e.g., client-side conferencing software, which could, for example, be via a client application or a web application used to connect to a conference implemented using server-side conferencing software, such as the conferencing software 314 shown in FIG. 3) and may connect to a server device 406. The server device 406 may execute software (e.g., server-side conferencing software, such as the conferencing software 314) to support the video conference 402 between the participants using the participant devices 404A to 404C. For example, the server device 406 could be a server at the datacenter 106 shown in FIG. 1, such as the application server 108 or the telephony server 112. Although three participant devices 404A to 404C are shown and described by example, other numbers of participant devices may be used with the system 400. For example, in some cases, the video conference 402 may involve many (e.g., 20, 30, or more) participants using participant devices.

The participant devices 404A to 404C may enable individual participants to communicate and collaborate remotely with one another in the video conference 402. For example, the participants may use the participant devices 404A to 404C to send video data depicting themselves and audio data representing their speech to other participants and to receive video and audio data from the other participants. The server device 406 may receive, during the video conference 402, video feeds corresponding to the participants (e.g., a video feed 1 of P1 via the participant device 404A, a video feed 2 of P2 via the participant device 404B, and a video feed 3 of P3 via the participant device 404C). The video feeds may be displayed in a GUI used by a participant alongside audio output for participant speech. For example, the video feeds may be displayed in a first GUI associated with participant device 404A (e.g., for P1 to view), in a second GUI associated with participant device 404B (e.g., for P2 to view), and in a third GUI associated with participant device 404C (e.g., for P3 to view).

The system 400 is illustrated as including the server device 406. However, some implementations may be performed in systems lacking a server that are doing point to point video. In this case, the gaze detection of each participant may be done at their corresponding participant device (e.g., one of the participant devices 404A to 404C) and added to their outgoing stream. The gaze correction for each of the incoming streams may be done at the receiving participant device. In some implementations, gaze detection may be preformed by the hardware of one or more of the participant devices 404A to 404C. For example, some laptops or virtual reality (VR) devices include eye tracking hardware.

Figure 5:
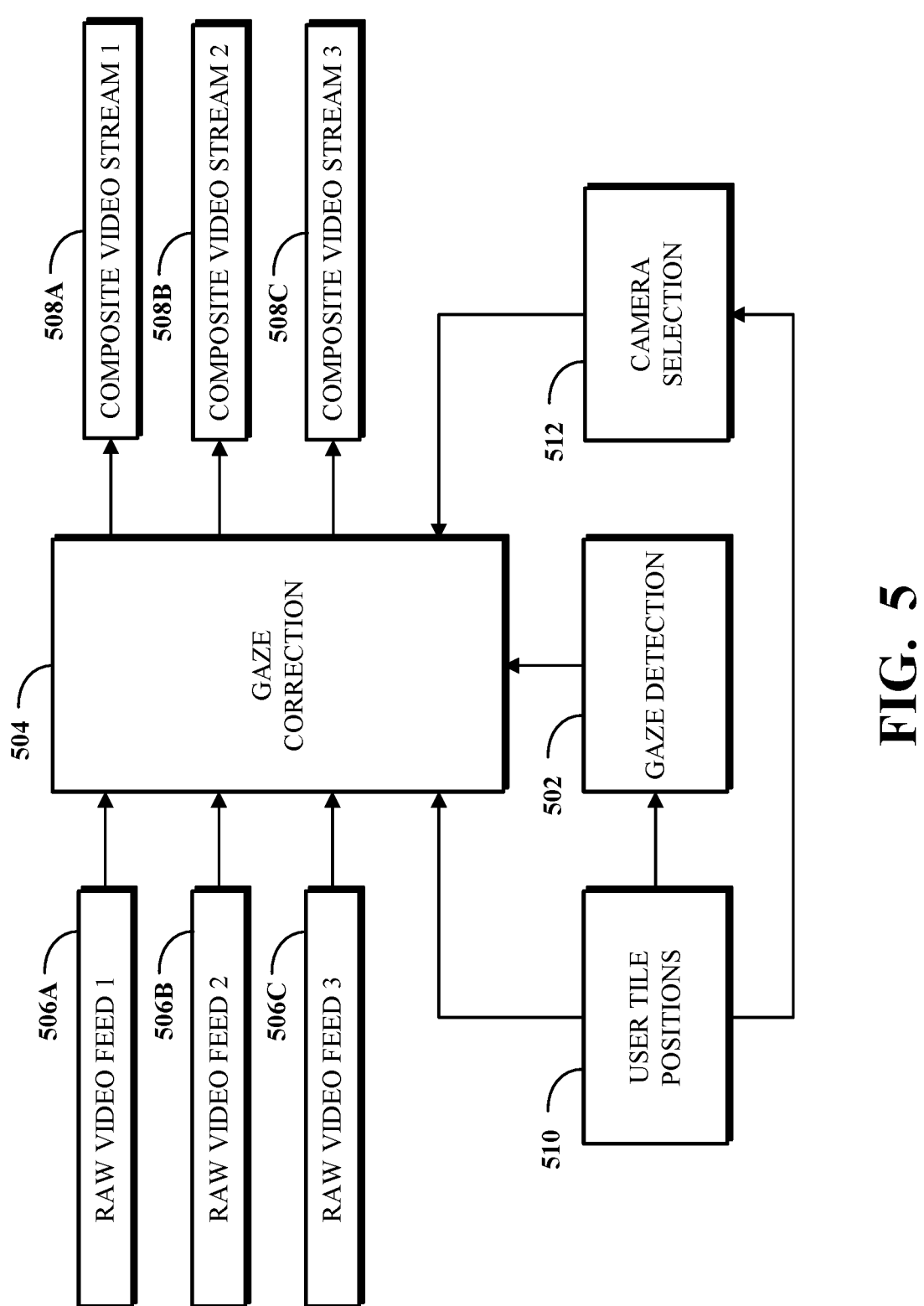
FIG. 5 is a block diagram of an example of software for changing directions of gaze during a video conference.

The server device 406, and/or the participant devices 404A to 404C, may run gaze detection software (e.g., the other software 318) to follow gazes of participants during the video conference 402. The server device 406, and/or the participant devices 404A to 404C, may also run the conferencing software (e.g., the conferencing software 314) to digitally correct the gazes of participants to simulate direct eye contact with other participants of the video conference 402. For example, with additional reference to FIG. 5, gaze detection logic 502, which may be implemented by the gaze detection software, can detect which participant that a particular participant may be looking at. In some cases, this may include the gaze detection logic 502 calculating, from pupils of a participant, an intersection point at a GUI used by the participant, then correlating the intersection point to a user tile of another participant in the GUI. For example, the gaze detection logic 502 can detect that P1 is looking at the user tile of P2 in the GUI. Then, gaze correction logic 504, which may be implemented by the conferencing software, can digitally correct one or more of the raw video feeds 506A to 506C, received from cameras of the participant devices 404A to 404C, to change gazes of one or more of the participants in composite video streams 508A to 508C transmitted to GUI's at user interfaces of the participant devices 404A to 404C. Each composite video stream may comprise one or more of the raw video feeds 506A to 506C and/or one or more digital corrections of the video feeds 506A to 506C. The gazes, when corrected, may be changed so that participants appear to be looking at the correct participants that are being addressed. For example, when P1 is looking at P2 in the GUI, the gaze correction logic 504 can digitally correct the raw video feed 506A, generated from a camera connected to the participant device 404A, to change the gaze of P1 in the composite video stream 508B transmitted to the participant device 404B. This may enable the gaze of P1 to appear to be looking at the camera when viewed in the GUI by P2. Further, the gaze correction logic 504 can digitally correct the raw video feed 506A to change the gaze of P1 in the composite video stream 508A transmitted the participant device 404A. This may enable the gaze of P1 to appear to be looking at P2 in the GUI when viewed in the GUI by P1. Additionally, the gaze correction logic 504 can digitally correct the raw video feed 506A to change the gaze of P1 in the composite video stream 508C transmitted the participant device 404C. This may enable the gaze of P1 to appear to be looking at P2 in the GUI when viewed in the GUI by P3. As a result, the gaze correction logic 504 can digitally correct the gaze of particular participants (e.g., P1), in separate video feeds transmitted to separate participants (e.g., P2 and P3), so that the gazes appear to be looking at the correct participants. As described above, the gaze is corrected at the server device 406. In some implementations, the server device 406 may send the same stream to all of the participant devices 404A to 404C, and the gaze may be corrected at each individual participant device 404A to 404C. Furthermore, as discussed above, in some cases, the gaze detection is performed at the participant devices 404A to 404C and then the gaze detection information is sent to the server device 406 along with the video and audio generated by the participant devices 404A to 404C. Alternatively, the server may do the gaze detection.

In some cases, the server device 406 uses the gaze intent to determine which streams to send to which participant devices 404A to 404C. In some cases, the stream of the participant who is speaking is sent to all of the participant devices 404A to 404C. In some cases, the server device 406 or the participant device 404A determines that the participant at the participant device 404A is looking at the participant at the participant device 404B, even though the participant at the participant device 404B is not speaking. In response, the server device 406 may transit the stream from the participant device 404B to the participant device 404A.

In some implementations, the gaze detection logic 502, the gaze correction logic 504, and/or the camera selection logic 512 may utilize user tile positions 510. The user tile positions 510 may include in a data structure X and Y positions (e.g., Cartesian coordinates) of user tiles in one or more GUI's (e.g., the gallery layouts) associated with the participants during the video conference 402. For example, the gaze detection logic 502 can utilize the user tile positions 510 to identify a particular participant based on a gaze by a participant toward an X and Y position associated with a particular user tile. In another example, the gaze correction logic 504 can utilize the user tile positions 510 to correct the gaze of a particular participant based on a distance between the gaze and an X and Y position associated with a particular user tile. In another example, the camera selection logic 512 can utilize the user tile positions 510 to determine a camera to use for a raw video based on a distance between the camera and an X and Y position associated with a particular user tile that the participant is looking at.

In some implementations, camera selection logic 512 may select a camera to use for the raw video feed and, in turn, the composite video stream. For example, P1 may have a plurality of cameras for providing the raw video feed. A first camera of the plurality of camera may be selected as a default camera. When the gaze detection logic 502 detects that P1 is looking at the user tile of P2 in the GUI, the camera selection logic 512 may select a camera that is closest to the user tile of P2 in the GUI. This may enable digital correction of a raw video feed from a starting point that is closest to a desired correction result.

Some implementations relate to correcting the gaze by changing the pupils in the composite video. However, some implementations may additionally alter the image to give the perception that the participant is turning their head in the direction they are looking as well. This may be accomplished using various techniques, for example resynthesizing the video from the associated participant device 404A to 404C or using an avatar or other digital puppet to represent the participant.

Figure 6:
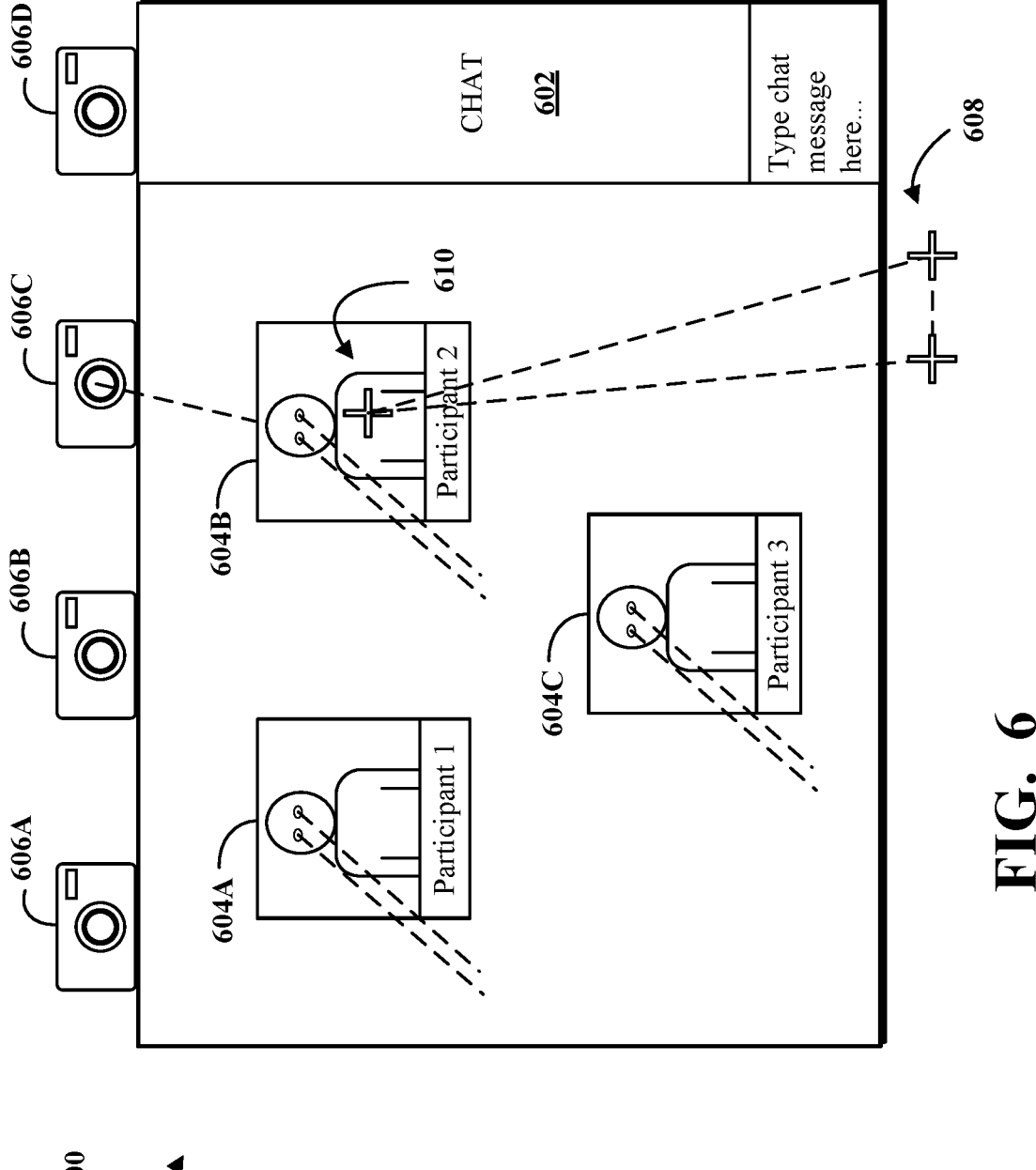
FIG. 6 is an illustration of an example of a graphical user interface (GUI) associated with a first participant during a video conference.

FIG. 6 is an illustration of an example of a GUI 600 associated with P1 during the video conference 402. The GUI 600 could be configured for display to a user interface of the participant device 402A. For example, the GUI 600 could be configured for display to a user interface like the user interface 212. The GUI 600 may include chat messages 602 that may be typed and exchanged between the conference participants during the video conference (e.g., P1, P2, and P3). The GUI 600 may also include user tiles, from the raw video feeds 506A to 506C of the participants, associated with the participants. For example, the GUI 600 may include user tiles 604A to 604C, in composite video stream 508A generated from the raw video feeds 506A to 506C, that are associated with the participants P1 to P3 (e.g., user tile 604A associated with P1 using the participant device 402A, user tile 604B associated with the second participant using the participant device 402B, and user tile 604C associated with the third participant using the participant device 402C). The participants in the user tiles 604A to 604C may appear to be looking in different directions (e.g., denoted by dashed lines from the user tiles 604A to 604C) based on the way in which their cameras capture them (e.g., the raw video feeds 506A to 506C from cameras connected to the participant device 402A to 402C). For example, P1 may be using a first camera 606A, among multiple cameras 606A to 606D, as a default camera selected during the video conference 402 to capture their own video and generate the raw video feed 506A. While multiple cameras 606A to 606D are shown, in some implementations, a user such as P1 may use a single camera instead of multiple cameras.

The gaze detection logic 502 can identify, during the video conference 402, P2 based on a direction of a gaze of P1 toward the user tile 604B associated with P2 within the GUI 600. For example, user tiles 604A to 604C, including the user tile 604B associated with P2, could be output to the GUI 600 in a gallery layout. The system can identify the user tile 604B based on a direction of a gaze of P1 toward the user tile 604B in the gallery layout. In some cases, this may include calculating, from pupils 608 of P2, an intersection point 610 at the GUI 600, then correlating the intersection point 610 to a position of a user tile (e.g., based on X and Y coordinates in a GUI), such as the user tile 604B.

In some implementations, a machine learning model may be used to determine the intersection point 610 at the GUI 600 based on the gaze, and/or to correlate the intersection point 610 to the position of a user tile, such as the user tile 604B. The machine learning model may be trained based on past intersection points associated with past communications with other participants. For example, the machine learning model may be trained, based on a training dataset including imagery (e.g., multiple images) of people physically present in conference rooms gazing at the person to whom they are speaking to cause a remote participant to appear to gaze at the person to whom the remote participant is speaking. The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

Figure 7:
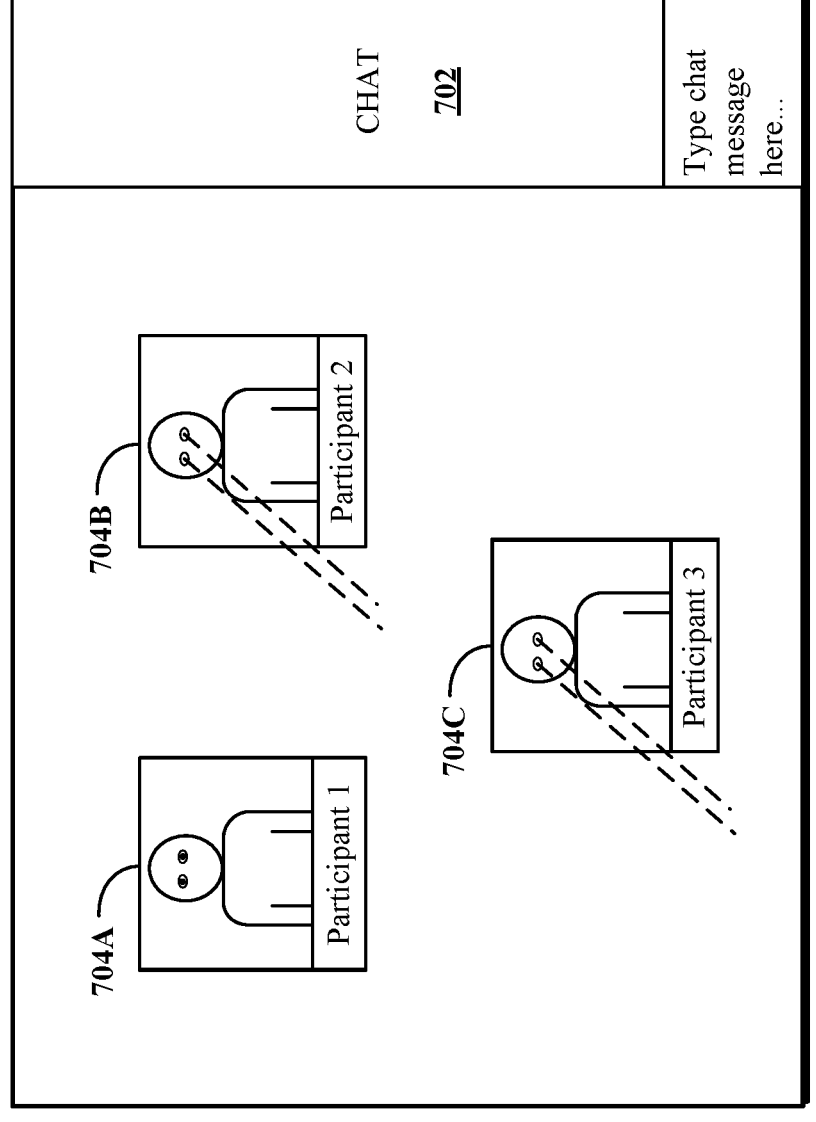
FIG. 7 is an illustration of an example of a GUI associated with a second participant during the video conference.
Figure 7:

The gaze correction logic 504 can then cause a change, in composite video stream 508B transmitted to participant device 402B of P2 during the video conference 402, to the direction of the gaze of P1 to appear directed toward a camera of P1 (e.g., correcting the gaze at a first endpoint, relative to P2). For example, FIG. 7 is an illustration of an example of a GUI 700 associated with P2 during the video conference 402. The GUI 700 could be configured for display to a user interface like the user interface 212. The GUI 700 may include chat messages 702 that may be typed and exchanged between the conference participants during the video conference (e.g., P1, P2, and P3). The GUI 700 may also include user tiles, in a composite video stream 508B based on the raw video feeds 506A to 506C, that are associated with the participants. For example, the GUI 600 may include user tiles 704A to 704C, from the composite video stream 508B, that are associated with the participants P1 to P3 using the participant devices 402A to 402C. Based on the gaze correction logic 504 causing the change in the composite video stream 508B (e.g., P1 looking at P2), P1 in user tile 704A may appear to be looking at the camera (e.g., directly at P2). The gaze correction logic 504 can make the correction by correcting, digitally in the user tile 704A associated with P1, the pupils, head, body, and/or three dimensional (3D) representation of P1 to appear looking at the camera.

In some implementations, the camera selection logic 512 may select the camera 606C to use for the raw video feed 506A and, in turn, the composite video stream 508B. For example, the camera selection logic 512 may switch from the first camera 606A, the default camera, to camera 606C based on the gaze detection logic 502 identifying P2 based on a direction of a gaze of P1 toward the user tile 604B. This may enable digital correction of the raw video feed 506A, in the composite video stream 508B, from a starting point that is closest to a desired correction result (e.g., P1 looking at P2).

Further, the gaze correction logic 504 can also cause a change, in composite video stream 508A transmitted to a participant device 402A of P1 during the video conference 402, to the direction of the gaze of P1 to appear directed toward the user tile 604B of P2 (e.g., correcting the gaze at a second endpoint, relative to P1). This would result in an update to the GUI 600 of FIG. 6. Based on the gaze correction logic 504 causing the change in the composite video stream 508B (e.g., P1 looking at P2), P1 in user tile 604A may be updated to appear looking at P2 in user tile 604B. The gaze correction logic 504 can make the correction by correcting, digitally in the user tile 604A associated with P1, the pupils, head, and/or body of P1 to appear looking at P2 in user tile 604B. In some implementations, the gaze correction logic 504 can make the correction by correcting, digitally in a 3D representation of P1, the 3D representation of P1 to appear looking at 3D representation of P2.

Figure 8:
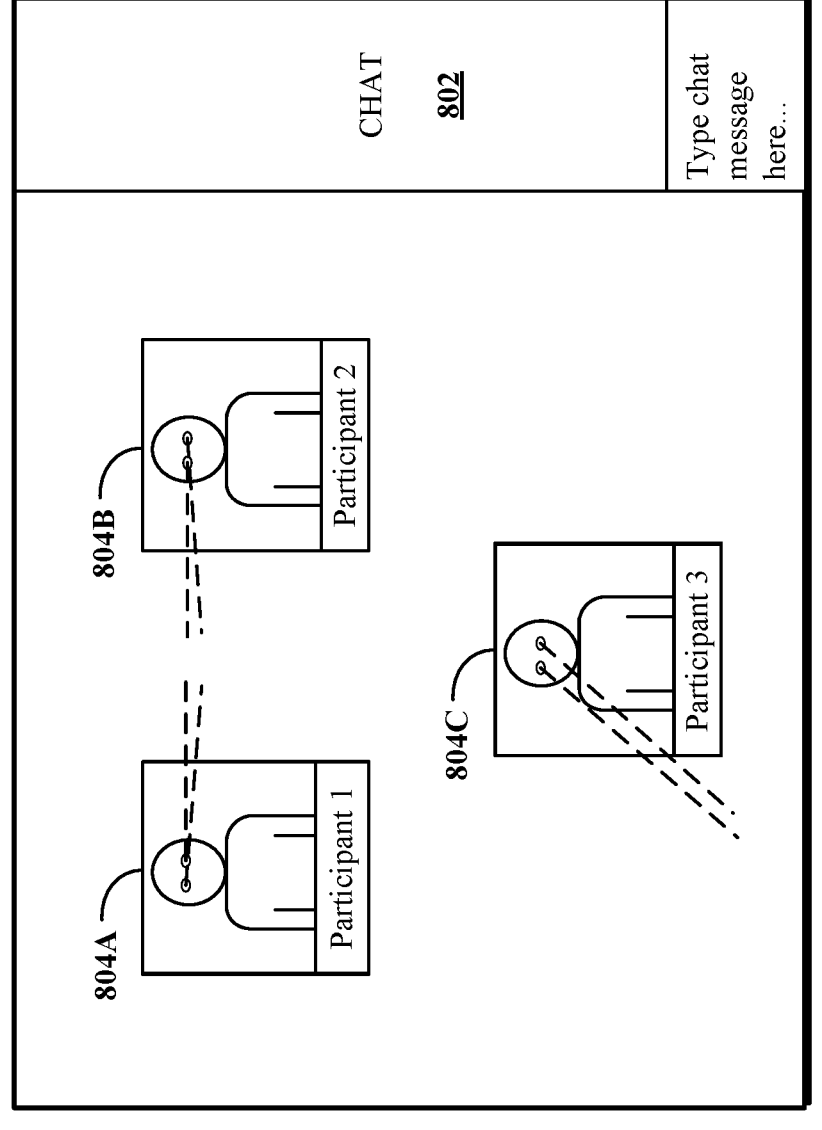
FIG. 8 is an illustration of an example of a GUI associated with a third participant during the video conference.
Figure 8:

The gaze correction logic 504 can also cause a change, in composite video stream 508C transmitted to a participant device 402C of P3 during the video conference 402, to the direction of the gaze of P1 to appear directed toward the user tile of P2 (e.g., correcting the gaze at a third endpoint, relative to P3). For example, FIG. 8 is an illustration of an example of a GUI 800 associated with P3 during the video conference 402. The GUI 800 could be configured for display to a user interface like the user interface 212. The GUI 800 may include chat messages 802 that may be typed and exchanged between the conference participants during the video conference (e.g., P1, P2, and P3). The GUI 800 may also include user tiles, in a composite video stream 508C based on the raw video feeds 506A to 506C, that are associated with the participants. For example, the GUI 800 may include user tiles 804A to 804C, from the composite video stream 508C, that are associated with the participants P1 to P3 using the participant devices 402A to 402C. Based on the gaze correction logic 504 causing the change in the composite video stream 508C (e.g., P1 looking at P2), P1 in user tile 804A may appear to be looking at P2 in user tile 804B. The gaze correction logic 504 can make the correction by correcting, digitally in the user tile 804A associated with P1, the pupils, head, and/or body of P1 to appear looking at P2 in user tile 804B. In some implementations, the gaze correction logic 504 can make the correction by correcting, digitally in 3D representation of P1, a 3D representation of P1 to appear looking at a 3D representation of P2.

Further, when P2 begins to look at P1 in the GUI 700, the gaze correction logic 504 can cause another change in composite video stream 508C (e.g., P2 looking at P1), so that P1 in user tile 804A and P2 in user tile 804B may appear to be looking at another when viewed in the GUI 800 by P3. As a result, when P1 is speaking directly to P2, and P1 is looking at the GUI 600 instead of their camera, P2 will perceive P1 as looking directly at them. Further, P3 will perceive P1 as looking directly at P2.

To further describe some implementations in greater detail, reference is next made to examples of techniques which may be performed using a system for prioritizing a participant from other conference participants. FIG. 9 is a flowchart of an example of a technique 900 for changing directions of gaze during a video conference. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof. The technique 900 may require authorization of an account administrator prior to use.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a system may identify, during a video conference, a first participant based on a direction of a gaze of a second participant toward a user tile associated with the first participant within a GUI of the video conference. For example, the server device 406 and/or the participant devices 404A to 404D of FIG. 4, running the gaze detection software and/or the conferencing software, may identify, during the video conference 402, P2 based on a direction of a gaze of P1 toward a user tile 604B associated with P2 within the GUI 600. In some implementations, a plurality of user tiles, including the user tile associated with the first participant, could be output to the GUI in a gallery layout. The system can identify the user tile based on a direction of a gaze of the second participant toward the user tile in the gallery layout. In some implementations, identifying the user tile may include calculating, from pupils of the second participant, an intersection point at the GUI, and correlating the intersection point to the user tile. In some implementations, a machine learning model may be used to determine an intersection point at the GUI based on the gaze, and/or to correlate the intersection point to the position of the user tile.

At 904, the system may cause a change, in a video stream transmitted to a device of the first participant during the video conference, to the direction of the gaze of the second participant to appear directed toward a camera of a device of the second participant. For example, the server device 406 and/or the participant devices 404A to 404D of FIG. 4, running the gaze detection software and/or the conferencing software, may cause a change, in the composite video stream 508B transmitted to the participant device 402B of P2 during the video conference 402, to the direction of the gaze of P1 to appear directed toward a camera of the participant device 402A of P1. In some implementations, the system can cause a change, in a second video stream transmitted to a device of the second participant, to the direction of the gaze of the second participant in a second user tile to appear directed toward the user tile of the first participant. In some implementations, the system can cause a change, in a third video stream transmitted to a device of a third participant, to the direction of the gaze of the second participant in a second user tile to appear directed toward a user tile of the first participant.

In some implementations, the technique 900 can include training a machine learning model used for the gaze detection and correction described above. For example, the machine learning model may be used to detect the direction of the gaze based on the positions of people on a screen of a participant whose gaze direction is being determined. The machine learning model may correct the direction of the gaze of the participant based on the position of the participant on a display unit and the position of the person to whom the gaze is directed. The machine learning model may be trained, for example, using at least one of supervised learning, unsupervised learning, semi-supervised learning, or reinforcement learning.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

Some implementations are described below as numbered examples (Example 1, 2, 3, etc.). These examples are provided as examples only and do not limit the other implementations disclosed herein.

Example 1 is a method, comprising: identifying, during a video conference, a first participant based on a direction of a gaze of a second participant toward a user tile associated with the first participant within a graphical user interface (GUI) of the video conference; and causing a change, in a video stream transmitted to a device of the first participant during the video conference, to the direction of the gaze of the second participant to appear directed toward a camera of a device of the second participant.

In Example 2, the subject matter of Example 1 includes, causing a change, in a second video stream transmitted to a device of a third participant, to the direction of the gaze of the second participant to appear directed toward the user tile.

In Example 3, the subject matter of Examples 1-2 includes, calculating, from pupils of the second participant, an intersection point at the GUI; and correlating the intersection point to the user tile.

In Example 4, the subject matter of Examples 1-3 includes, using a machine learning model to determine an intersection point at the GUI based on the gaze; and correlating the intersection point to a position of the user tile.

In Example 5, the subject matter of Examples 1-4 includes, wherein causing the change comprises: selecting the camera, from a plurality of cameras of the device of the second participant, based on the camera being closest to the user tile.

In Example 6, the subject matter of Examples 1-5 includes, wherein causing the change comprises: correcting, digitally in a user tile associated with the second participant, pupils of the second participant.

In Example 7, the subject matter of Examples 1-6 includes, causing a change, in a second video stream transmitted to a device of a third participant, to a 3D representation of the second participant to appear directed toward a 3D representation of the first participant.

In Example 8, the subject matter of Examples 1-7 includes, outputting a plurality of user tiles, in the GUI, in a gallery layout; and maintaining a data structure indicating X and Y positions of user tiles in the gallery layout during the video conference.

Example 9 is a system, comprising: a memory subsystem; and processing circuitry configured to execute instructions stored in the memory subsystem to: identify, during a video conference, a first participant based on a direction of a gaze of a second participant toward a user tile associated with the first participant within a graphical user interface (GUI) of the video conference; and cause a change, in a video stream transmitted to a device of the first participant during the video conference, to the direction of the gaze of the second participant to appear directed toward a camera of a device of the second participant.

In Example 10, the subject matter of Example 9 includes, wherein the processing circuitry is further configured to execute instructions stored in the memory subsystem to: arrange a plurality of user tiles, including the user tile associated with the first participant, in a gallery layout.

In Example 11, the subject matter of Examples 9-10 includes, wherein the processing circuitry is further configured to execute instructions stored in the memory subsystem to: correct, digitally in a user tile associated with the second participant, the head of the second participant.

In Example 12, the subject matter of Examples 9-11 includes, wherein the processing circuitry is further configured to execute instructions stored in the memory subsystem to: determine the user tile based on an intersection point at the GUI from pupils of the second participant.

In Example 13, the subject matter of Examples 9-12 includes, wherein the processing circuitry is further configured to execute instructions stored in the memory subsystem to: train a machine learning model, based on past intersection points associated with past communications with other participants, to the user tile.

In Example 14, the subject matter of Examples 9-13 includes, wherein the processing circuitry is further configured to execute instructions stored in the memory subsystem to: change from a first camera that is a default camera during the video conference to the camera based on the camera being closest to the user tile.

Example 15 is a computer readable medium storing instructions operable to cause one or more processors to perform operations comprising: identifying, during a video conference, a first participant based on a direction of a gaze of a second participant toward a user tile associated with the first participant within a graphical user interface (GUI) of the video conference; and causing a change, in a video stream transmitted to a device of the first participant during the video conference, to the direction of the gaze of the second participant to appear directed toward a camera of a device of the second participant.

In Example 16, the subject matter of Example 15 includes, wherein the video stream is a first composite video stream, transmitted to the device of the first participant, different from a second composite video stream transmitted to the device of the second participant.

In Example 17, the subject matter of Examples 15-16 includes, wherein the operations further comprise: selecting a default camera for the video conference; and changing from the default camera to the camera based on the camera being closest to the user tile.

In Example 18, the subject matter of Examples 15-17 includes, wherein the operations further comprise: causing a change, in a second video stream transmitted to a device of a third participant, to a 3D representation of the second participant to appear directed toward a 3D representation of the first participant.

In Example 19, the subject matter of Examples 15-18 includes, wherein the operations further comprise: outputting a plurality of user tiles, in the GUI, in a gallery layout; and maintaining a data structure indicating Cartesian coordinates of user tiles in the gallery layout during the video conference.

In Example 20, the subject matter of Examples 15-19 includes, wherein the operations further comprise: correcting, digitally in a user tile associated with the second participant, the body of the second participant.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A method, comprising:

identifying, during a video conference, a first participant based on a direction of a gaze of a second participant toward a user tile associated with the first participant within a graphical user interface (GUI) of the video conference; and causing a change, in a video stream transmitted to a device of the first participant during the video conference, to the direction of the gaze of the second participant to appear directed toward a camera of a device of the second participant, wherein the change comprises generating a personalized video stream for the first participant such that a gaze correction is applied in the video stream transmitted to the device of the first participant and not transmitted to other participant devices;

wherein the personalized video stream is generated by digitally correcting, for each recipient participant, the gaze of the second participant in a composite video stream based on a user tile position of the recipient in the GUI, such that the gaze correction is specific to a view of the recipient and is not present in video streams transmitted to other participants.

2. The method of claim 1, further comprising:

causing a change, in a second video stream transmitted to a device of a third participant, to the direction of the gaze of the second participant to appear directed toward the user tile.

3. The method of claim 1, further comprising:

calculating, from pupils of the second participant, an intersection point at the GUI; and correlating the intersection point to the user tile.

4. The method of claim 1, further comprising:

using a machine learning model trained on historical gaze intersection data from prior video conferences to determine an intersection point at the GUI based on the gaze; and correlating the intersection point to a position of the user tile.

5. The method of claim 1, wherein causing the change comprises:

selecting the camera, from a plurality of cameras of the device of the second participant, during the video conference, based on a calculated intersection point, such that the selected camera is physically closest to the user tile as displayed in the GUI.

6. The method of claim 1, wherein causing the change comprises:

correcting, digitally in a user tile associated with the second participant, pupils of the second participant.

7. The method of claim 1, further comprising:

causing a change, in a second video stream transmitted to a device of a third participant, to a 3D representation of the second participant to appear directed toward a 3D representation of the first participant.

8. The method of claim 1, further comprising:

outputting a plurality of user tiles, in the GUI, in a gallery layout; and maintaining a data structure indicating X and Y positions of user tiles in the gallery layout during the video conference.

9. A system, comprising:

a memory subsystem; and processing circuitry configured to execute instructions stored in the memory subsystem to:

identify, during a video conference, a first participant based on a direction of a gaze of a second participant toward a user tile associated with the first participant within a graphical user interface (GUI) of the video conference; and cause a change, in a video stream transmitted to a device of the first participant during the video conference, to the direction of the gaze of the second participant to appear directed toward a camera of a device of the second participant, wherein the change comprises a generation of a personalized video stream for the first participant such that a gaze correction is applied in the video stream transmitted to the device of the first participant and not transmitted to other participant devices;

wherein the personalized video stream is generated by digitally correcting for each recipient participant, the gaze of the second participant in a composite video stream based on a user tile position of the recipient in the GUI, such that the gaze correction is specific to a view of the recipient and is not present in video streams transmitted to other participants.

10. The system of claim 9, wherein the processing circuitry is further configured to execute instructions stored in the memory subsystem to:

arrange a plurality of user tiles, including the user tile associated with the first participant, in a gallery layout.

11. The system of claim 9, wherein the processing circuitry is further configured to execute instructions stored in the memory subsystem to:

correct, digitally in a user tile associated with the second participant, a head of the second participant.

12. The system of claim 9, wherein the processing circuitry is further configured to execute instructions stored in the memory subsystem to:

determine the user tile based on an intersection point at the GUI from pupils of the second participant.

13. The system of claim 9, wherein the processing circuitry is further configured to execute instructions stored in the memory subsystem to:

train a machine learning model, using a dataset of past intersection points and associated user tile selections.

14. The system of claim 9, wherein the processing circuitry is further configured to execute instructions stored in the memory subsystem to:

change from a first camera that is a default camera during the video conference to the camera based on the camera being closest to the user tile.

15. A non-transitory computer readable medium storing instructions operable to cause one or more processors to perform operations comprising:

identifying, during a video conference, a first participant based on a direction of a gaze of a second participant toward a user tile associated with the first participant within a graphical user interface (GUI) of the video conference; and causing a change, in a video stream transmitted to a device of the first participant during the video conference, to the direction of the gaze of the second participant to appear directed toward a camera of a device of the second participant, wherein the change comprises generating a personalized video stream for the participant such that a gaze correction is applied in the video stream transmitted to the device of the first participant and not transmitted to other participant devices;

wherein the personalized video stream is generated by digitally correcting, for each recipient participant, the gaze of the second participant in a composite video stream based on a user tile position of the recipient in the GUI, such that the gaze correction is specific to a view of the recipient and is not present in video streams transmitted to other participants.

16. The non-transitory computer readable medium of claim 15, wherein the video stream is a first composite video stream, transmitted to the device of the first participant, different from a second composite video stream transmitted to the device of the second participant.

17. The non-transitory computer readable medium of claim 15, wherein the operations further comprise:

selecting a default camera for the video conference; and changing from the default camera to the camera based on the camera being closest to the user tile.

18. The non-transitory computer readable medium of claim 15, wherein the operations further comprise:

causing a change, in a second video stream transmitted to a device of a third participant, to a 3D representation of the second participant to appear directed toward a 3D representation of the first participant.

19. The non-transitory computer readable medium of claim 15, wherein the operations further comprise:

outputting a plurality of user tiles, in the GUI, in a gallery layout; and maintaining a data structure indicating Cartesian coordinates of user tiles in the gallery layout during the video conference.

20. The non-transitory computer readable medium of claim 15, wherein the operations further comprise:

correcting, digitally in a user tile associated with the second participant, a body of the second participant.

* * * * *